US011402931B1

(12) United States Patent
Lee

(10) Patent No.: US 11,402,931 B1
(45) Date of Patent: Aug. 2, 2022

(54) TOUCHPAD MODULE AND COMPUTING DEVICE USING SAME

(71) Applicant: Primax Electronics Ltd., Taipei (TW)

(72) Inventor: Chao-Wei Lee, Taipei (TW)

(73) Assignee: PRIMAX ELECTRONICS LTD., Taipei (TW)

( * ) Notice: Subject to any disclaimer, the term of this patent is extended or adjusted under 35 U.S.C. 154(b) by 0 days.

(21) Appl. No.: 17/566,243

(22) Filed: Dec. 30, 2021

(30) Foreign Application Priority Data

Dec. 1, 2021 (TW) ................................ 110144859

(51) Int. Cl.
*G06F 3/0354* (2013.01)
*G06F 1/16* (2006.01)
*G06F 3/02* (2006.01)

(52) U.S. Cl.
CPC .......... *G06F 3/03547* (2013.01); *G06F 1/169* (2013.01); *G06F 3/0202* (2013.01)

(58) Field of Classification Search
CPC ..... G06F 3/03547; G06F 1/169; G06F 3/0202
See application file for complete search history.

(56) References Cited

U.S. PATENT DOCUMENTS

| 2007/0146348 | A1* | 6/2007 | Villain | G06F 3/0219 |
| | | | | 345/173 |
| 2012/0071206 | A1* | 3/2012 | Pemberton-Pigott | G06F 3/042 |
| | | | | 455/566 |
| 2016/0154427 | A1* | 6/2016 | Sun | G06F 1/169 |
| | | | | 312/223.2 |
| 2017/0024029 | A1* | 1/2017 | Kitamura | G06F 1/169 |
| 2017/0038801 | A1* | 2/2017 | Lee | G06F 1/1656 |
| 2018/0107378 | A1* | 4/2018 | Rosenberg | G06F 3/04883 |
| 2019/0243475 | A1* | 8/2019 | Huang | G06F 1/1681 |
| 2020/0333917 | A1* | 10/2020 | Lu | G06F 1/169 |
| 2021/0149491 | A1* | 5/2021 | Takahashi | H02K 33/18 |
| 2021/0333898 | A1* | 10/2021 | Wang | G06F 3/03547 |
| 2022/0113819 | A1* | 4/2022 | Li | G06F 1/169 |

* cited by examiner

*Primary Examiner* — Amit Chatly
(74) *Attorney, Agent, or Firm* — Kirton McConkie; Evan R. Witt

(57) ABSTRACT

A touchpad module includes a touch member, a first base plate, a second base plate and two elastic elements. The first base plate includes a first stopping part and a second stopping part. The second base plate is arranged between the touch member and the first base plate. The second base plate include a third stopping part and a fourth stopping part. The third stopping part is engaged with the first stopping part. The fourth stopping part is engaged with the second stopping part. The two elastic elements are arranged between the first base plate and the second base plate. When an external force is exerted on the touch member, the touch member is swung toward the first base plate by using a junction between the second stopping part and the fourth stopping part as a fulcrum.

11 Claims, 14 Drawing Sheets

TOUCHPAD MODULE AND COMPUTING DEVICE USING SAME

FIELD OF THE INVENTION

The present invention relates to an input device, and more particularly to an input device with a touch control function.

BACKGROUND OF THE INVENTION

With increasing development of science and technology, a variety of electronic devices are designed in views of convenience and user-friendliness. For helping the user well operate the electronic devices, the electronic devices are gradually developed in views of humanization. The common electronic devices include for example notebook computers, mobile phones, satellite navigation devices, or the like. Recently, the storage capacity and the processor's computing performance for these electronic devices are largely enhanced, and thus their functions become more powerful and complicated. For efficiently operating an electronic device, a touchpad is used as an input device of the electronic device for controlling the operations of the electronic device.

FIG. 1 schematically illustrates a conventional notebook computer with a touchpad module. As shown in FIG. 1, the touchpad module 1 is installed on a casing 21 of the notebook computer 2. Moreover, at least a portion of the touchpad module 1 is exposed outside so as to be touched by the user's finger. Consequently, the user may operate the touchpad module 1 to control the notebook computer 2. For example, in case that the user's finger is placed on the touchpad module 1 and slid on the touchpad module 1, a cursor 23 shown on a display screen 22 of the notebook computer 2 is correspondingly moved. Moreover, in case that the touchpad module 1 is pressed down by the user's finger, the notebook computer 2 executes a specified function. The use of the touchpad module 1 can implement some functions of the conventional mouse. In other words, the user may operate the notebook computer 2 through the touchpad module 1 without the need of additionally carrying or installing the mouse.

FIG. 2 is a schematic cross-sectional view illustrating the touchpad module as shown in FIG. 1, in which the touchpad module is not pressed down. FIG. 3 is a schematic cross-sectional view illustrating the touchpad module as shown in FIG. 2, in which the touchpad module is pressed down. As shown in FIGS. 2 and 3, a fixing frame 24 is concavely formed in the casing 21 of the notebook computer 2. The touchpad module 1 is installed within the fixing frame 24. The touchpad module 1 comprises a supporting structure 11, a triggering part 12 and a touch member 13. The supporting structure 11 and triggering part 12 are located at two opposite sides of the fixing frame 24. The touch member 13 of the touchpad module 1 is connected with the supporting structure 11. Consequently, the touch member 13 of the touchpad module 1 can be swung relative to the triggering part 12 by using the supporting structure 11 as a fulcrum. The touchpad module 1 further comprises a switch 14. The switch 14 is located under the touch member 13 and aligned with the triggering part 12.

While the touch member 13 is pressed down by the user, the touch member 13 is swung downwardly relative to the triggering part 12 by using the supporting structure 11 as a fulcrum. When the switch 14 of the touchpad module 1 is pushed by the triggering part 12 of the fixing frame 24, the switch 14 is triggered to generate a switch signal to the notebook computer 2. According to the switch signal, the notebook computer 2 executes a corresponding function. When the touch member 13 is no longer pressed by the user, the touch member 13 is swung upwardly relative to the triggering part 12 in response to the elastic force of the supporting structure 11. Consequently, the touch member 13 is returned to its original position.

Generally, the supporting structure 11 is connected with the upper component and the lower component through iron elements or plastic structures (e.g., sponge structures). Consequently, as the iron elements or the plastic structures are subjected to deformation, the touch member 13 can be swung upwardly or downwardly. However, the conventional touchpad module 10 still has some drawbacks. For example, the main pressing function of the touchpad module 1 is related to the surface material (e.g., glass) of the touch member 13 and the comprehensive rigidity of the printed circuit board. As the trend of designing notebook computer 2 is toward light weightiness and slimness, the thinner material is gradually used as the surface material of the touch member 13 to replace glass, and the thickness of the printed circuit board is gradually reduced. If the touch member 13 is made by the thinner material, the overall rigidity of the touch member 13 is usually insufficient. Consequently, the pressing function of the touch member 13 is adversely affected.

Therefore, there is a need of providing an improved touchpad module in order to overcome the above drawbacks.

SUMMARY OF THE INVENTION

An object of the present invention provides a touchpad module. The structure of the touchpad module is specially designed to achieve better structural flatness and structural rigidity. Consequently, the pressing force and the press stroke are more uniform.

The other objects and advantages of the present invention will be understood from the disclosed technical features.

In accordance with an aspect of the present invention, a touchpad module for a computing device is provided. The touchpad module is installed within a fixing frame of a computing device. The touchpad module includes a touch member, a first base plate, a second base plate, a first elastic element and a second elastic element. The touch member includes a switch. The first base plate is located under the touch member. The first base plate includes a triggering part, a first stopping part and a second stopping part. The first stopping part and the second stopping part are respectively located beside two lateral sides of the triggering part. The triggering part is aligned with the switch. The second base plate is arranged between the touch member and the first base plate. The second base plate include a third stopping part and a fourth stopping part. The third stopping part is engaged with the first stopping part. The fourth stopping part is engaged with the second stopping part. The first elastic element is arranged between the first base plate and the second base plate. The second elastic element is arranged between the first base plate and the second base plate. In addition, the second elastic element is located beside the first elastic element. When an external force is exerted on a first region of the touch member, the touch member is swung toward the first base plate by using a junction between the second stopping part and the fourth stopping part as a fulcrum. Consequently, the switch is contacted with the triggering part and the second base plate is correspondingly swung toward the first base plate. While the second base plate is swung toward the first base plate, the second base plate is moved downwardly to push the first elastic element. Consequently, the first elastic element is subjected to deformation and the third stopping part is disengaged from the first stopping part.

In an embodiment, when the external force is exerted on a second region of the touch member, the touch member is swung toward the first base plate by using a junction between the first stopping part and the third stopping part as the fulcrum, so that the switch is contacted with the triggering part and the second base plate is correspondingly swung toward the first base plate. While the second base plate is swung toward the first base plate, the second base plate is moved downwardly to push the second elastic element, so that the second elastic element is subjected to deformation and the fourth stopping part is disengaged from the second stopping part.

In an embodiment, the first base plate includes a first edge portion and a second edge portion opposed to the first edge portion, and the second base plate includes a third edge portion and a fourth edge portion opposed to the third edge portion. The first edge portion and the third edge portion are aligned with each other. The second edge portion and the fourth edge portion are aligned with each other. The triggering part, the first stopping part and the second stopping part are included in the first edge portion. The third stopping part and the fourth stopping part are included in the third edge portion.

In an embodiment, the first base plate further includes at least one first coupling part, and the second base plate further include at least one second coupling part. The at least one first coupling part is included in the second edge portion of the first base plate. The at least one second coupling part is included in the fourth edge portion of the second base plate. The at least one first coupling part is engaged with the at least one second coupling part.

In an embodiment, the first base further includes a recess, and the second base plate further includes a retaining wall. The recess is concaved in a direction away from the second base plate. The retaining wall is extended in a direction toward the first base plate. The recess is included in the first edge portion of the first base plate. The retaining wall is included in the third edge portion of the second base plate.

In an embodiment, the third stopping part and the fourth stopping part are connected with the retaining wall. The retaining wall is extended in a first direction toward the first base plate. The third stopping part and the fourth stopping part are extended in a second direction. The first direction and the second direction are not in parallel with each other.

In an embodiment, the first elastic element and the second elastic element are arranged between the first edge portion of the first base plate and the second edge portion of the second base plate. Each of the first elastic element and the second elastic element includes a first connection part, a second connection part and an inclined part. The first connection part is contacted with the recess of the first base plate. The second connection part is contacted with the second base plate. The second connection part is located beside the retaining wall. The inclined part is connected between the first connection part and the second connection part.

In an embodiment, the touchpad module further includes a third base plate, and the third base plate is arranged between the touch member and the first base plate. The first base plate includes a first edge portion and a second edge portion opposed to the first edge portion. The first stopping part and the second stopping part are included in the first edge portion. The second base plate is aligned with the first edge portion. The third base plate is aligned with the second edge portion.

In an embodiment, the first base plate further includes at least one first coupling part, and the third base plate include at least one second coupling part. The at least one first coupling part is included in the second edge portion of the first base plate. The at least one first coupling part is engaged with the at least one second coupling part.

In an embodiment, the touch member includes a circuit board and a covering plate, wherein the covering plate is located over the circuit board, and the switch is installed on the circuit board.

In accordance with another aspect of the present invention, a computing device is provided. The computing device includes a casing, a processor and a touchpad module. A fixing frame is concavely formed in the casing. The processor is disposed within the casing. The touchpad module is disposed within the casing and electrically connected with the processor. The touchpad module includes a touch member, a first base plate, a second base plate, a first elastic element and a second elastic element. The touch member includes a switch. The first base plate is located under the touch member. The first base plate includes a triggering part, a first stopping part and a second stopping part. The first stopping part and the second stopping part are respectively located beside two lateral sides of the triggering part. The triggering part is aligned with the switch. The second base plate is arranged between the touch member and the first base plate. The second base plate include a third stopping part and a fourth stopping part. The third stopping part is engaged with the first stopping part. The fourth stopping part is engaged with the second stopping part. The first elastic element is arranged between the first base plate and the second base plate. The second elastic element is arranged between the first base plate and the second base plate. In addition, the second elastic element is located beside the first elastic element. When an external force is exerted on a first region of the touch member, the touch member is swung toward the first base plate by using a junction between the second stopping part and the fourth stopping part as a fulcrum. Consequently, the switch is contacted with the triggering part and the second base plate is correspondingly swung toward the first base plate. While the second base plate is swung toward the first base plate, the second base plate is moved downwardly to push the first elastic element. Consequently, the first elastic element is subjected to deformation and the third stopping part is disengaged from the first stopping part.

From the above descriptions, the structure of the touchpad module is specially designed. Due to the cooperation of the stopping parts and the elastic elements, the heights of the left side and the right side of the bottom surface of the touch member are substantially equal. Consequently, the structural flatness and the structural rigidity of the touchpad module are enhanced, and the pressing force and the press stroke are more uniform. Moreover, the first base plate is equipped with the recess, and the second base plate is equipped with the retaining wall. Consequently, the overall structural rigidity of the touchpad module is largely increased to meet the slimness requirements.

The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

Figure 1:
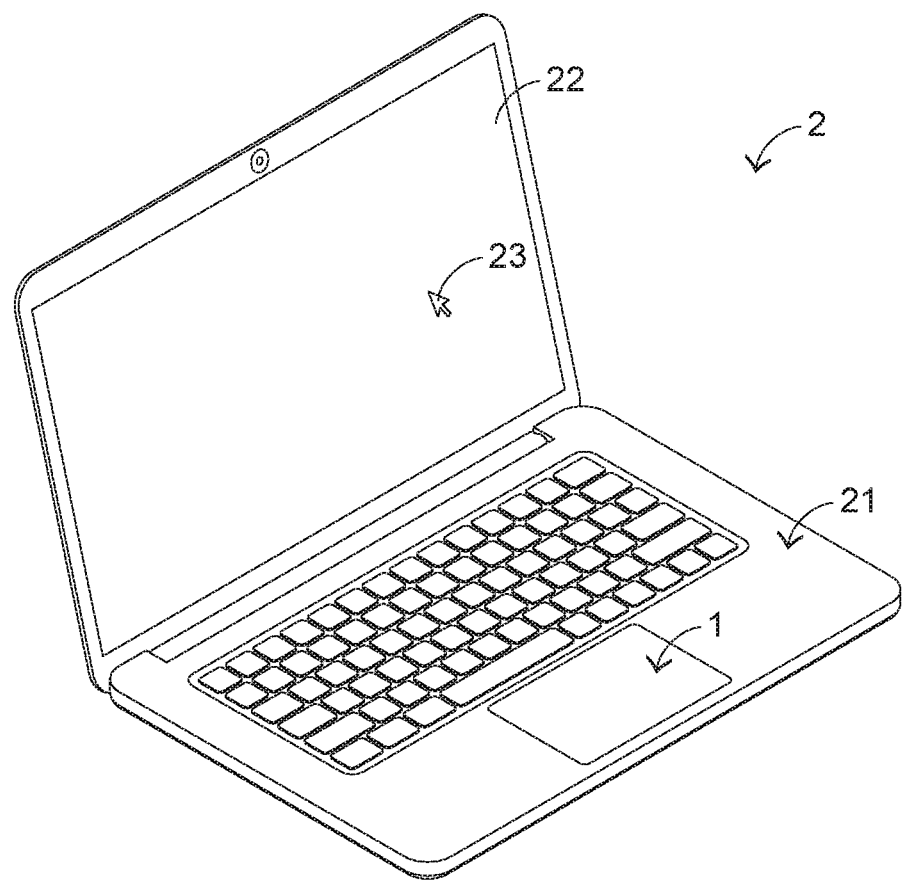
FIG. 1 schematically illustrates a conventional notebook computer with a touchpad module.
Figure 2:
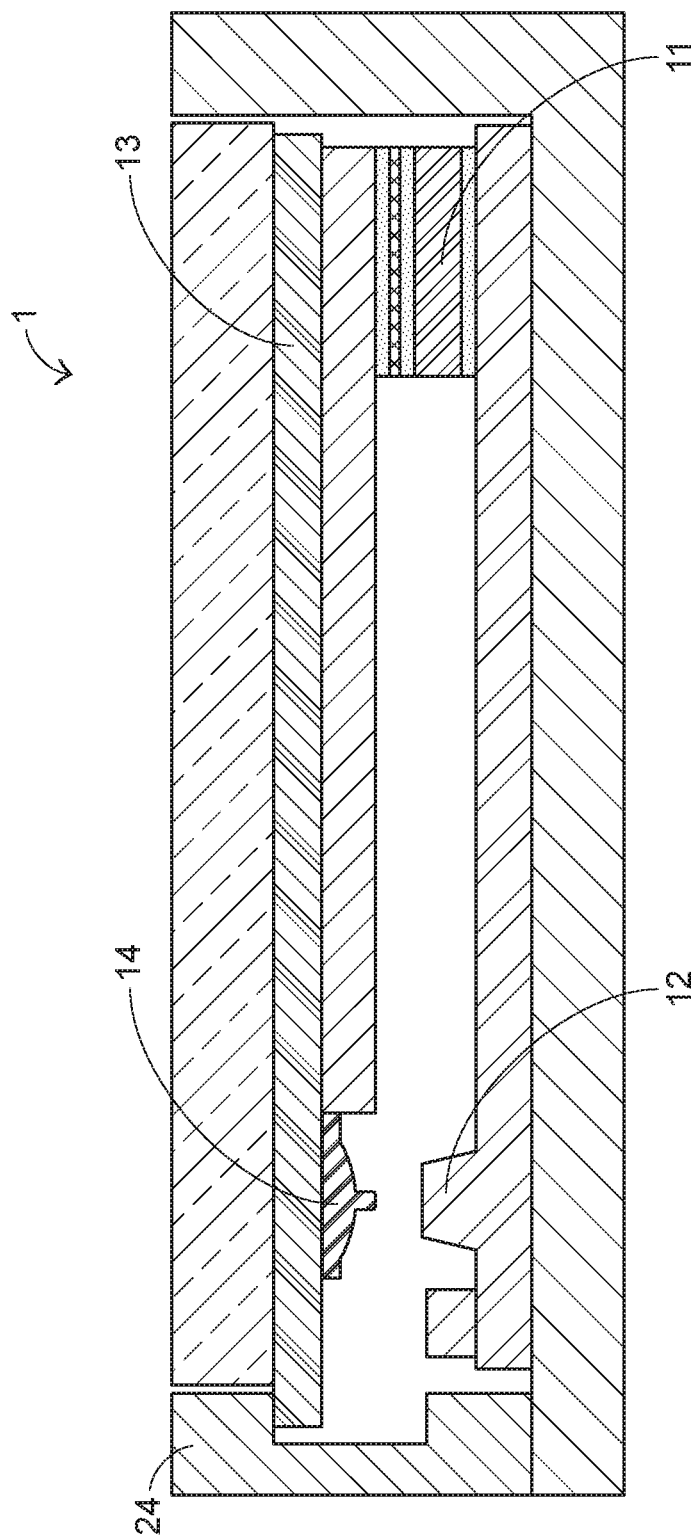
FIG. 2 is a schematic cross-sectional view illustrating the touchpad module as shown in FIG. 1, in which the touchpad module is not pressed down.
Figure 3:
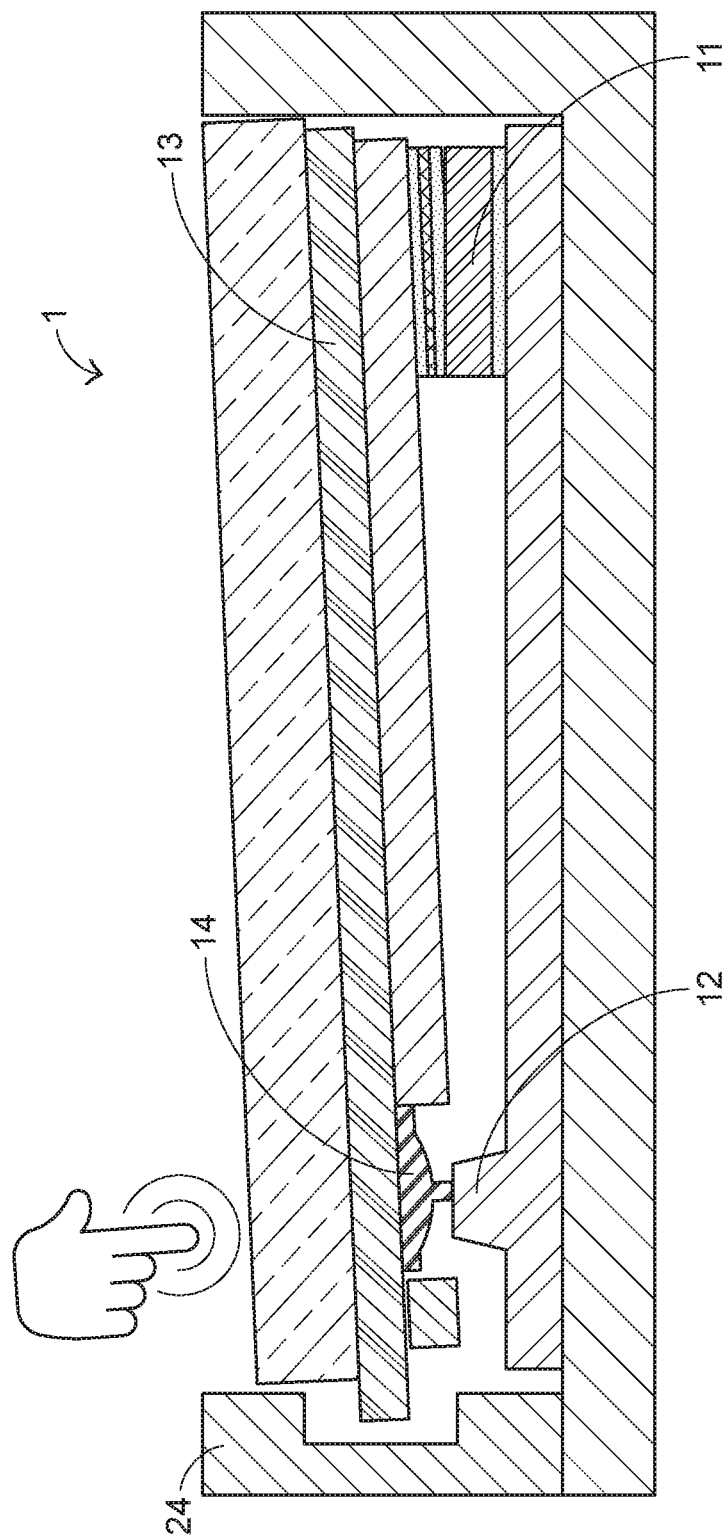
FIG. 3 is a schematic cross-sectional view illustrating the touchpad module as shown in FIG. 2, in which the touchpad module is pressed down.
Figure 4:
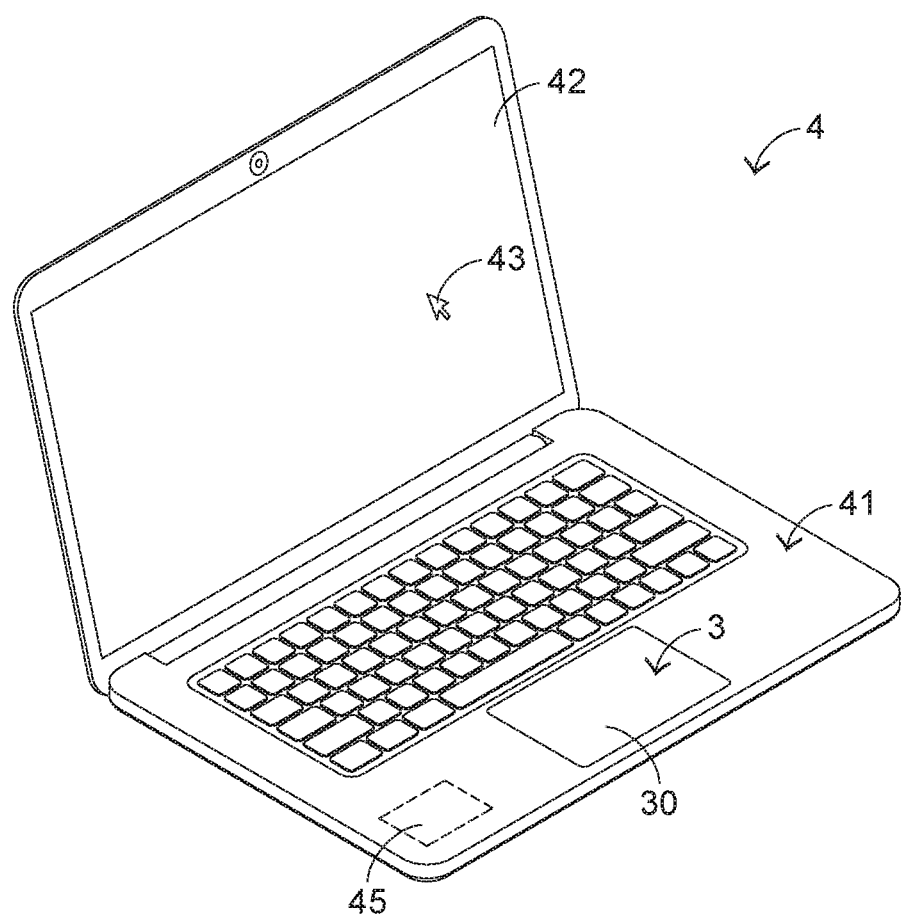
FIG. 4 is a schematic perspective view illustrating the outer appearance of a computing device with a touchpad module according to an embodiment of the present invention.

FIG. 4 is a schematic perspective view illustrating the outer appearance of a computing device with a touchpad module according to a first embodiment of the present invention. An example of the computing device 4 includes but is not limited to a notebook computer. In an embodiment, the computing device 4 comprises a casing 41, a display screen 42, a processor 45 and a touchpad module 3. The processor 45 is disposed within the casing 41. The processor 41 is used for processing electronic signals of the computing device 4. Moreover, a fixing frame 44 is concavely formed in the casing 41 (see FIGS. 11 and 12). The touchpad module 3 is disposed within the fixing frame 44 and electrically connected with the processor 45. In addition, at least a portion of the touchpad module 3 is exposed outside so as to be touched by the user's finger. Consequently, the user can operate the touchpad module 3 to control the computing device 4. For example, in case that the user's finger is placed on the touchpad module 3 and slid on the touchpad module 3, a cursor 43 shown on the display screen 42 is correspondingly moved. Moreover, in case that the touchpad module 3 is pressed down by the user's finger, the computing device 4 executes a specified function.

The other structure of the touchpad module 3 will be described in more details as follows.

Figure 5:
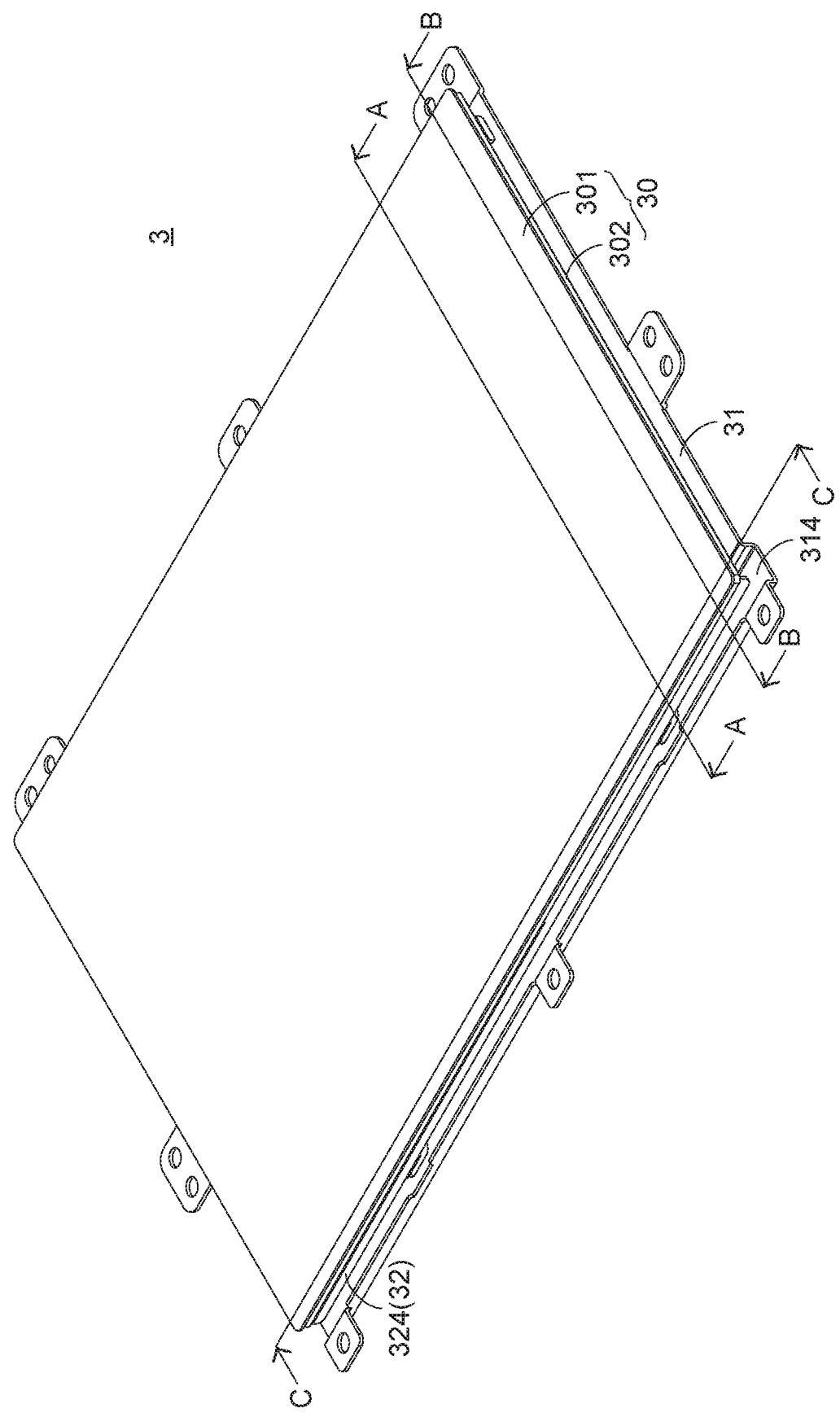
FIG. 5 is a schematic perspective view illustrating the appearance of the touchpad module as shown in FIG. 4.
Figure 6:
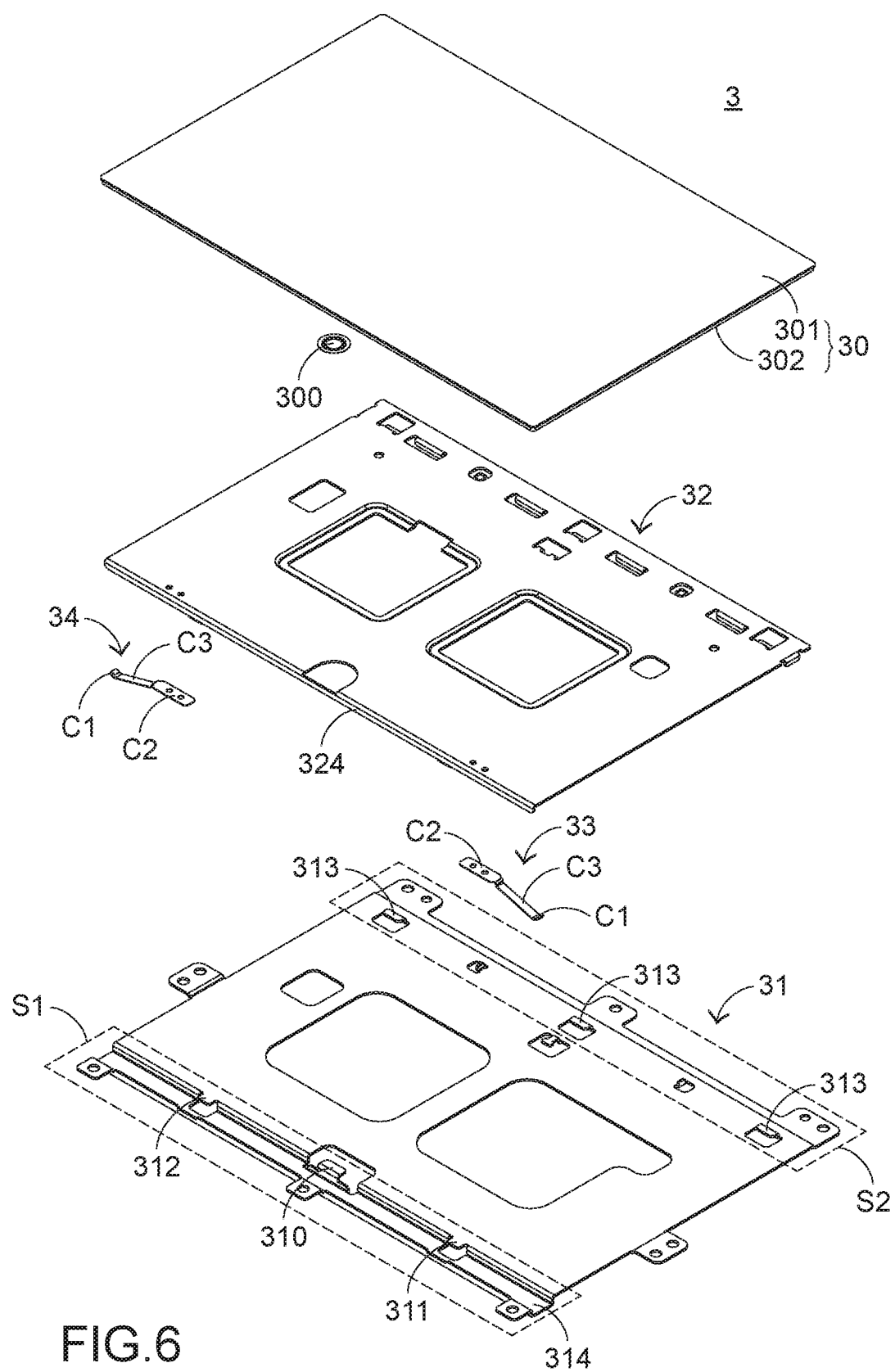
FIG. 6 is a schematic exploded view illustrating the touchpad module as shown in FIG. 5.
Figure 7:
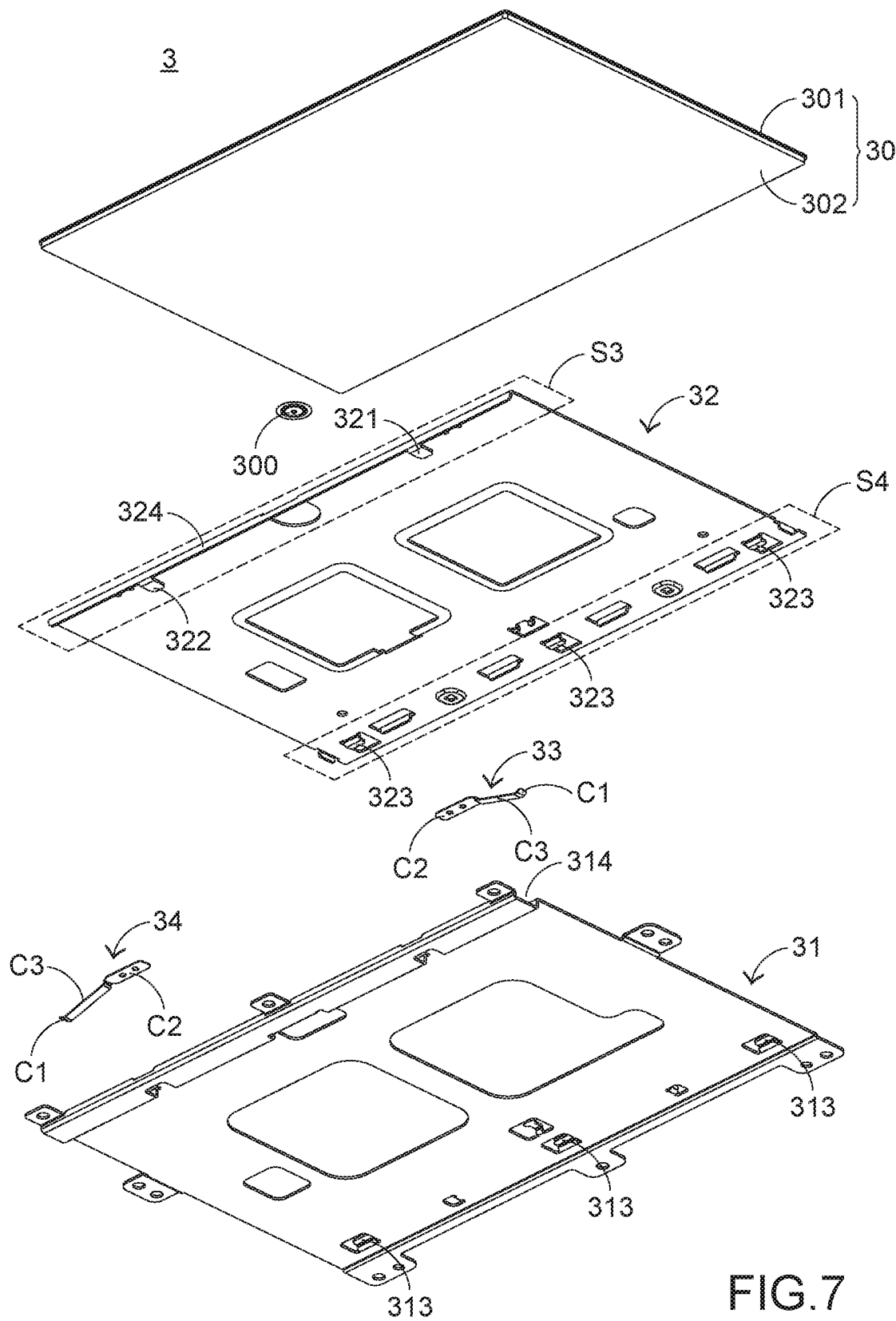
FIG. 7 is a schematic exploded view illustrating the touchpad module as shown in FIG. 5 and taken along another viewpoint.
Figure 8:
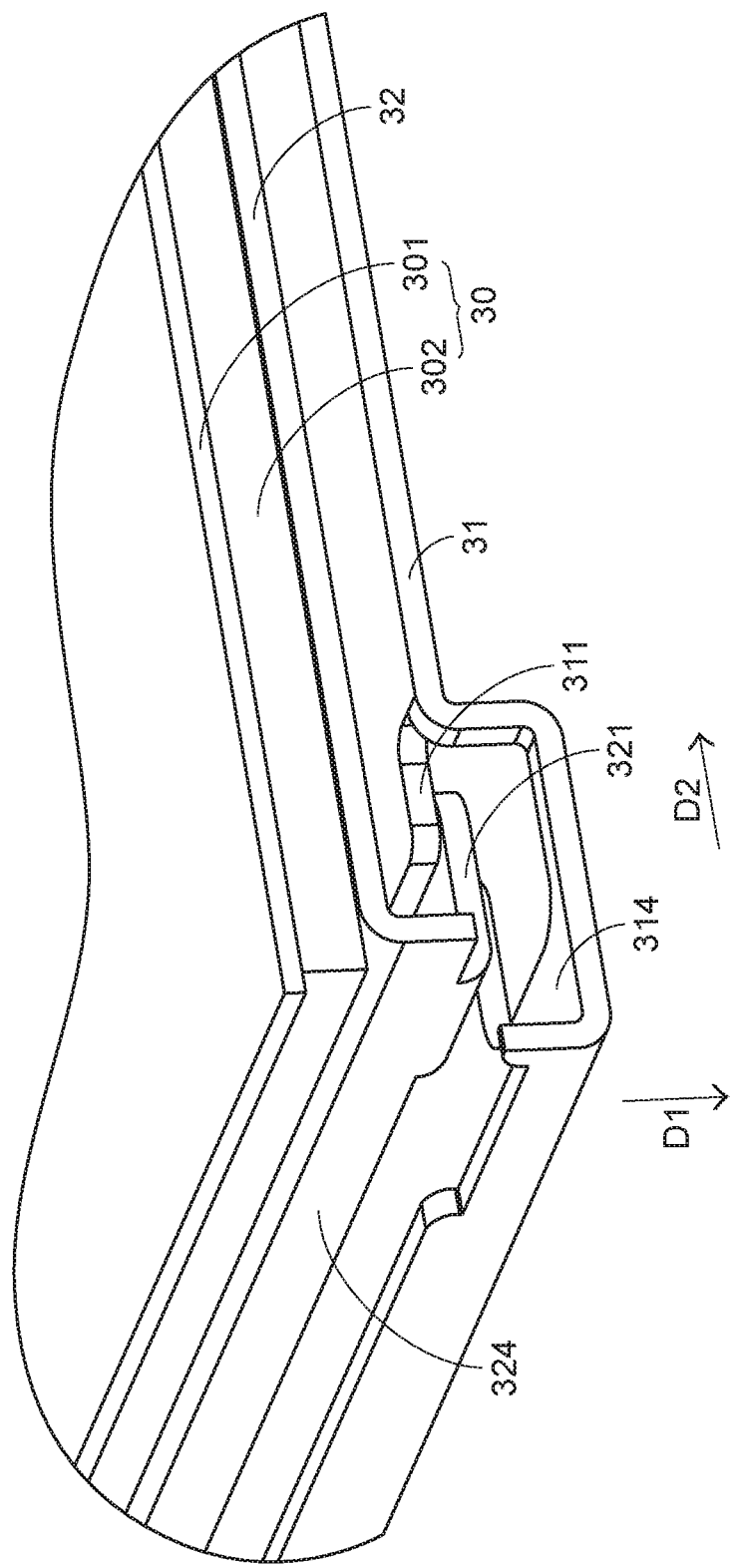
FIG. 8 is a schematic cutaway view illustrating the touchpad module as shown in FIG. 5 and taken along the line AA.
Figure 9:
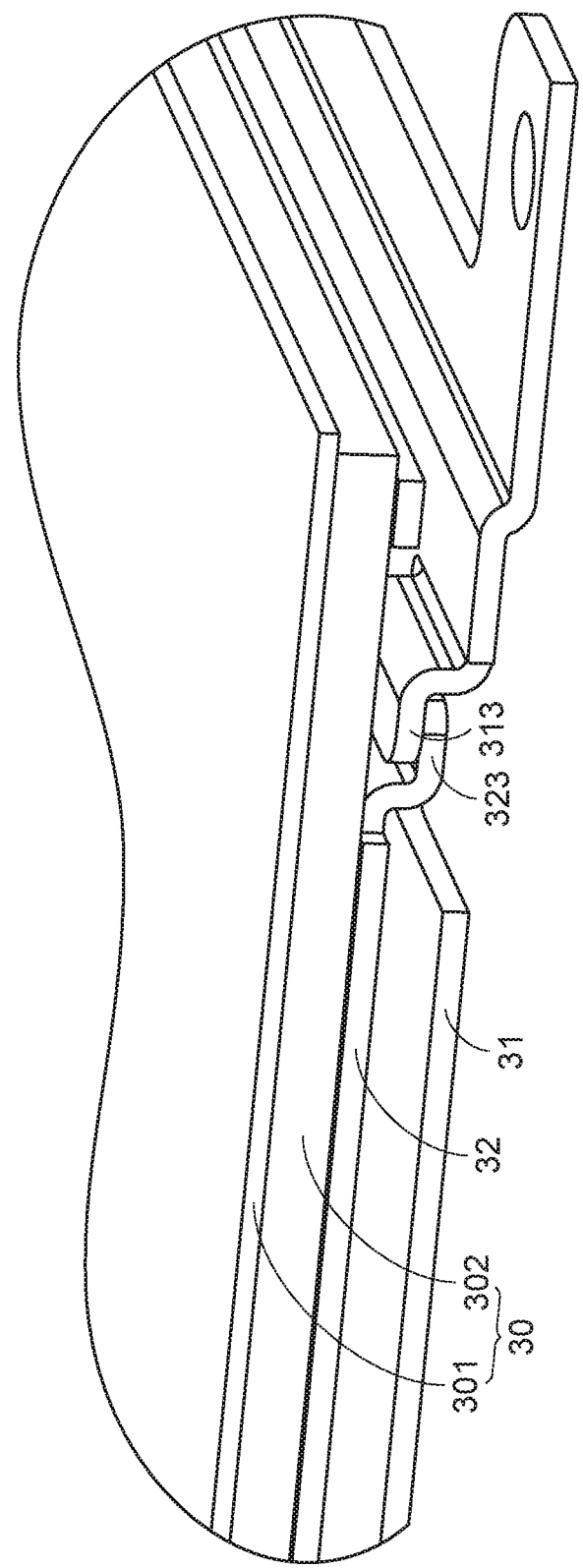
FIG. 9 is a schematic cutaway view illustrating the touchpad module as shown in FIG. 5 and taken along the line BB.
Figure 10:
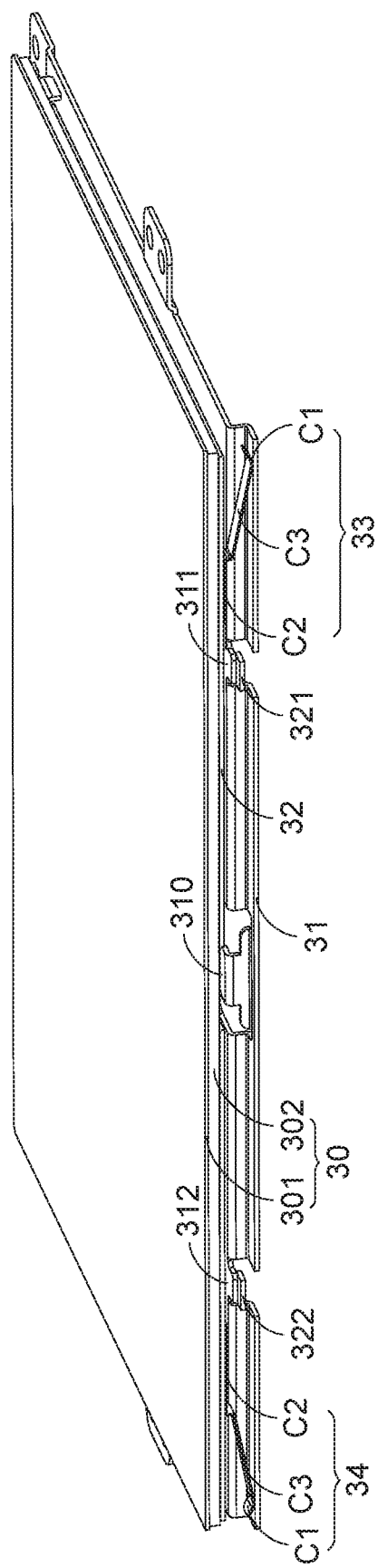
FIG. 10 is a schematic cutaway view illustrating the touchpad module as shown in FIG. 5 and taken along the line CC.

Please refer to FIGS. 5, 6, 7, 8, 9 and 10. FIG. 5 is a schematic perspective view illustrating the appearance of the touchpad module as shown in FIG. 4. FIG. 6 is a schematic exploded view illustrating the touchpad module as shown in FIG. 5. FIG. 7 is a schematic exploded view illustrating the touchpad module as shown in FIG. 5 and taken along another viewpoint. FIG. 8 is a schematic cutaway view illustrating the touchpad module as shown in FIG. 5 and taken along the line AA. FIG. 9 is a schematic cutaway view illustrating the touchpad module as shown in FIG. 5 and taken along the line BB. FIG. 10 is a schematic cutaway view illustrating the touchpad module as shown in FIG. 5 and taken along the line CC.

As shown in FIGS. 5, 6, 7, 8, 9 and 10, the touch pad module 3 of this embodiment a touch member 30, a first base plate 31, a second base plate 32, a first elastic element 33 and a second elastic element 34.

The touch member 30 comprises a switch 300. The first base plate 31 is located under the touch member 30. The first base plate 31 comprises a triggering part 310, a first stopping part 311 and a second stopping part 312. The first stopping part 311 and the second stopping part 312 are located beside two lateral sides of the triggering part 310. The triggering part 310 of the first base plate 31 is aligned with the switch 300 of the touch member 30. The second base plate 32 is arranged between the touch member 30 and the first base plate 31. The second base plate 32 comprises a third stopping part 321 and a fourth stopping part 322. When the first base plate 31 and the second base plate 32 are assembled with each other, the first stopping part 311 of the first base plate 31 is engaged with the third stopping part 321 of the second base plate 32, and the second stopping part 312 of the first base plate is engaged with the fourth stopping part 322 of the second base plate 32. The first elastic element 33 is arranged between the first base plate 31 and the second base plate 32. The second elastic element 34 is arranged between the first base plate 31 and the second base plate 32. In addition, the second elastic element 34 is located beside the first elastic element 33.

Please refer to FIGS. 5, 6, 7, 8, 9 and 10 again. In an embodiment, the touch member 30 comprises a covering plate 301 and a circuit board 302. The covering plate 301 is located over the circuit board 302. The covering plate 301 and the circuit board 302 are combined together through an adhesive layer (not shown). The switch 300 is installed on a bottom surface of the circuit board 302. The bottom surface of the circuit board 302 faces the first base plate 31 and the second base plate 32. Preferably but not exclusively, the covering plate 301 is made of mylar or any other appropriate material. The material of the covering plate 301 may be varied according to the practical requirements. Preferably but not exclusively, the switch 33 is a metal dome. Preferably but not exclusively, the first base plate 31 and the second base plate 32 are made of metallic material or any appropriate material.

Please refer to FIGS. 6, 7, 8, 9 and 10 again. In this embodiment, the first base plate 31 further comprises a first edge portion S1 and a second edge portion S2, and the second base plate 32 further comprises a third edge portion S3 and a fourth edge portion S4. The first edge portion S1 of the first base plate 31 and the third edge portion S3 of the second base plate 32 are aligned with each other. The second edge portion S2 of the first base plate 31 and the fourth edge portion S4 of the second base plate 32 are aligned with each other. In this embodiment, the triggering part 310, the first stopping part 311 and the second stopping part 312 of the first base plate 31 are all included in the first edge portion S1, and the third stopping part 321 and the fourth stopping part 322 of the second base plate 32 are all included in the third edge portion S3.

Please refer to FIGS. 6, 7 and 9 again. In an embodiment, the first base plate 31 further comprises at least one first coupling part 313, and the second base plate 32 further comprise at least one second coupling part 323. It is noted that the number of the at least one first coupling part 313 and the number of the at least one second coupling part 323 are not restricted. In this embodiment, the at least one first coupling part 313 comprises three first coupling parts 313, and the at least one second coupling part 323 comprises three second coupling parts 323. These first coupling parts 313 are included in the second edge portion S2 of the first base plate 31, and these second coupling parts 323 are included in the fourth edge portion S4 of the second base plate 32. The first coupling parts 313 are aligned with the corresponding second coupling parts 323, respectively. When the first base plate 31 and the second base plate 32 are assembled with each other, the plural first coupling parts 313 are engaged with the corresponding second coupling parts 323, respectively.

Please refer to FIGS. 5, 6, 7 and 8. In this embodiment, the first base plate 31 further comprises a recess 314, and the second base plate 32 further comprises a retaining wall 324. The recess 314 is concaved in the direction away from the second base plate 32. The retaining wall 324 is extended in the direction toward the first base plate 31. In this embodiment, the recess 314 is included in the first edge portion S1 of the first base plate 31, and the retaining wall 324 is included in the third edge portion S3 of the second base plate 32. In other words, the recess 314 of the first base plate 31 and the retaining wall 324 of the second base plate 32 are aligned with each other. The recess 314 is formed by bending a portion of the first base plate 31. The retaining wall 324 is formed by bending a portion of the second base plate 32. The arrangement of the recess 314 and the retaining wall 324 can increase the structural strength of the first base plate 31 and the second base plate 32. Consequently, the overall structural strength of the touchpad module 3 is largely enhanced.

Please refer to FIGS. 6, 7 and 8 again. In this embodiment, the third stopping part 321 and the fourth stopping part 322 of the second base plate 32 are connected with a lateral side of the retaining wall 324. The retaining wall 324 is extended in a first direction D1 (i.e., the direction toward the first base plate 31). The third stopping part 321 and the fourth stopping part 322 are extended in a second direction D2. The first direction D1 and the second direction D2 are not in parallel with each other. Preferably but not exclusively, the first direction D1 and the second direction D2 are perpendicular to each other.

Please refer to FIGS. 6, 7 and 10. The first elastic element 33 and the second elastic element 34 are arranged between the first edge portion 51 of the first base plate 31 and the third edge portion S3 of the second base plate 32. Moreover, the first elastic element 33 is located beside the junction between the first stopping part 311 and the third stopping part 321, and the second elastic element 34 is located beside the junction between the second stopping part 312 and the fourth stopping part 322. That is, the first stopping part 311, the second stopping part 312, the third stopping part 321 and the fourth stopping part 322 are arranged between the first elastic element 33 and the second elastic element 34. It is noted that numerous modifications and alterations may be made while retaining the teachings of the invention. For example, in another embodiment, the first elastic element 33 and the second elastic element 34 are arranged between the first stopping part 311, the second stopping part 312, the third stopping part 321 and the fourth stopping part 322 (see FIGS. 11 and 12). In this embodiment, each of the first elastic element 33 and the second elastic element 34 comprises a first connection part C1, a second connection part C2 and an inclined part C3. The first connection part C1 is contacted with the recess 314 of the first base plate 31. The second connection part C2 is contacted with the second base plate 32. In addition, the second connection part C2 is located beside the retaining wall 324. The inclined part C3 is connected between the first connection part C1 and the second connection part C2.

The operations of the touchpad module 3 will be described in more details as follows.

Figure 11:
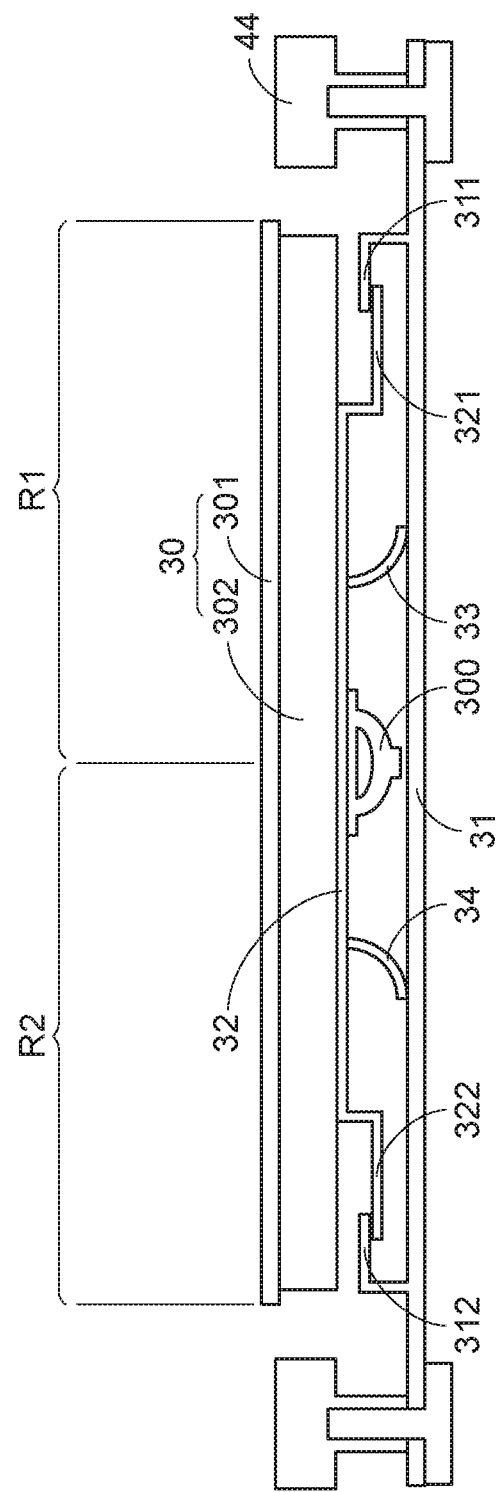
FIG. 11 is a schematic side view illustrating a variant example of the touchpad module according to the first embodiment of the present invention, in which the touchpad module is not pressed down.
Figure 12:
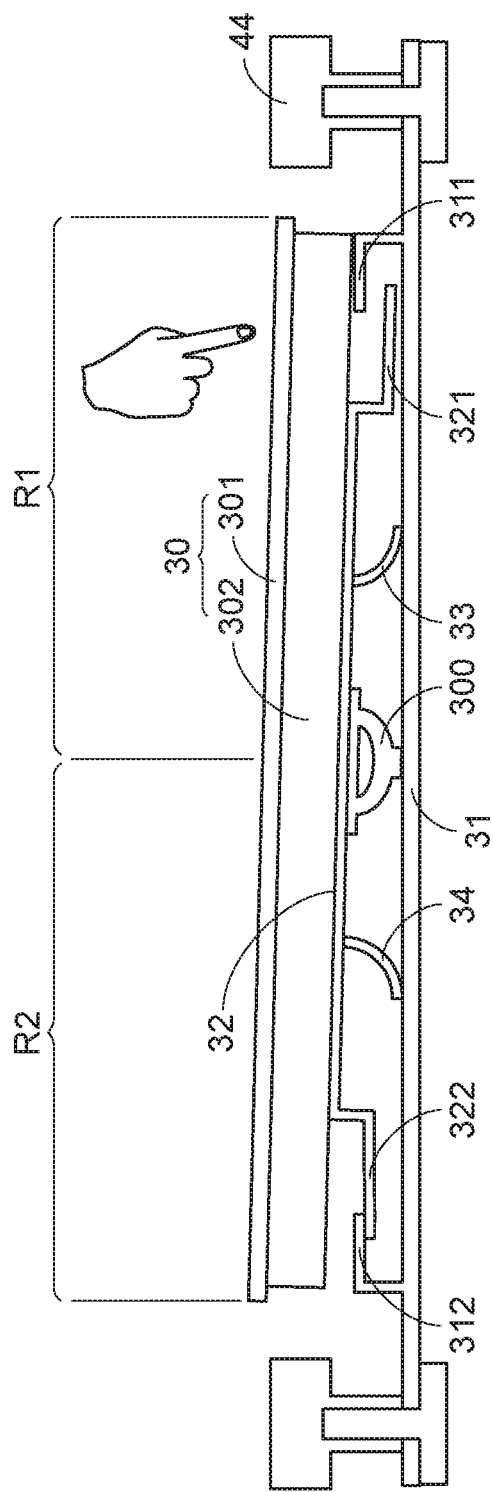
FIG. 12 is a schematic side view illustrating the touchpad module as shown in FIG. 11, in which the touchpad module is pressed down.

Please refer to FIGS. 11 and 12. FIG. 11 is a schematic side view illustrating a variant example of the touchpad module according to the first embodiment of the present invention, in which the touchpad module is not pressed down. FIG. 12 is a schematic side view illustrating the touchpad module as shown in FIG. 11, in which the touchpad module is pressed down. In this embodiment, the first elastic element 33 and the second elastic element 34 are arranged between the first stopping part 311, the second stopping part 312, the third stopping part 321 and the fourth stopping part 322. For clearly describing the operations of the associated components before/after the touchpad module is pressed down, some components are not shown in FIGS. 11 and 12.

Please refer to FIGS. 11 and 12. When an external force is exerted on a first region R1 of the touch member 30, the touch member 30 is swung in the direction toward the first base plate 31 by using the junction between the coupling part of the second stopping part 312 and the fourth stopping part 322 as a fulcrum. As the touch member 30 is swung toward the first base plate 31, the switch 300 on the touch member 30 is contacted with the triggering part 310 (see FIG. 6). Moreover, while the touch member 30 is swung toward the first base plate 31, the second base plate 32 is correspondingly swung toward the first base plate 31. While the second base plate 32 is swung toward the first base plate 31, the second base plate 32 is moved downwardly to push the first elastic element 33. Consequently, the first elastic element 33 is subjected to deformation. For example, as shown in FIGS. 6, 7 and 10, the inclined part C3 of the first elastic element 33 is subjected to deformation. At the same time, the third stopping part 321 of the second base plate 32 is disengaged from the first stopping part 311 of the first base plate 31.

Similarly, when an external force is exerted on a second region R2 of the touch member 30, the touch member 30 is swung in the direction toward the first base plate 31 by using the junction between the first stopping part 311 and the third stopping part 321 as a fulcrum. As the touch member 30 is swung toward the first base plate 31, the switch 300 on the touch member 30 is contacted with the triggering part 310 (see FIG. 6). Moreover, while the touch member 30 is swung toward the first base plate 31, the second base plate 32 is correspondingly swung toward the first base plate 31. While the second base plate 32 is swung toward to the first base plate 31, the second base plate 32 is moved downwardly to push the second elastic element 34. Consequently, the second elastic element 34 is subjected to deformation. For example, as shown in FIGS. 6, 7 and 10, the inclined part C3 of the second elastic element 34 are subjected to deformation). At the same time, the fourth stopping part 322 of the second base plate 32 is disengaged from the second stopping part 312 of the first base plate 31.

Especially, when the first region R1 or the second region R2 of the touch member 30 is pressed down in response to the external force, the second base plate 32 is correspondingly swung toward the first base plate 31 with the movement of the touch member 30. At the same time, the junctions between the first coupling parts 313 in the second edge portion S2 and the second coupling parts 323 in the fourth edge portion S4 provide the function similar to a rotating shaft. In other words, when the first region R1 of the touch member 30 is pressed down in response to the external force, the member touch 30 is swung toward the first base plate 31 by using the junction between the first stopping part 311 and the third stopping part 321 and the junction between the first coupling part 313 and the second coupling part 323 as the fulcrum. Similarly, when the second region R2 of the touch member 30 is pressed in response to the external force, the member touch 30 is swung toward the first base plate 31 by using the junction between the first stopping part 311 and the third stopping part 321 and the junction between the first coupling part 313 and the second coupling part 323 as the fulcrums.

Figure 13:
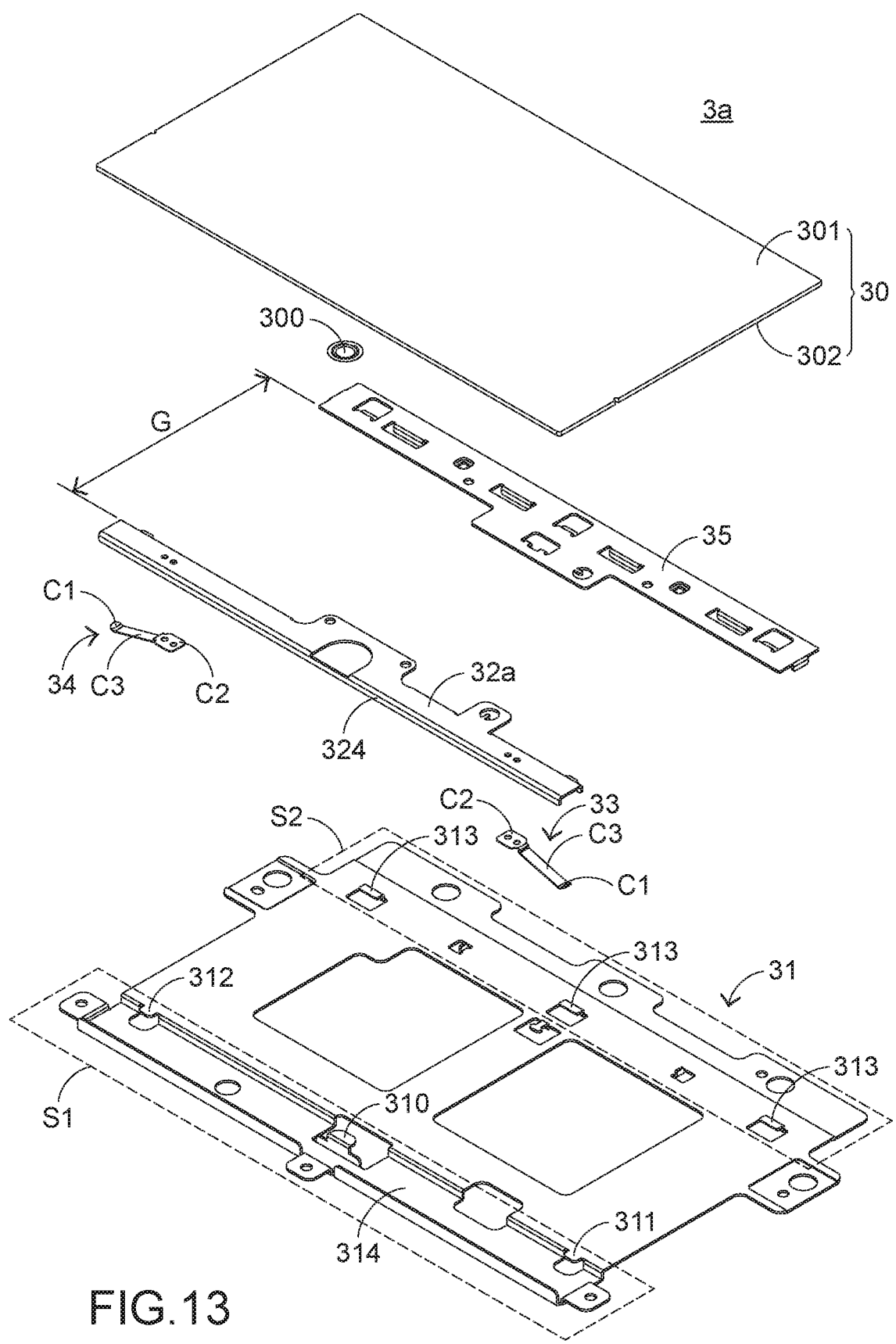
FIG. 13 is a schematic exploded view illustrating the touchpad module according to a second embodiment of the present invention.
Figure 14:
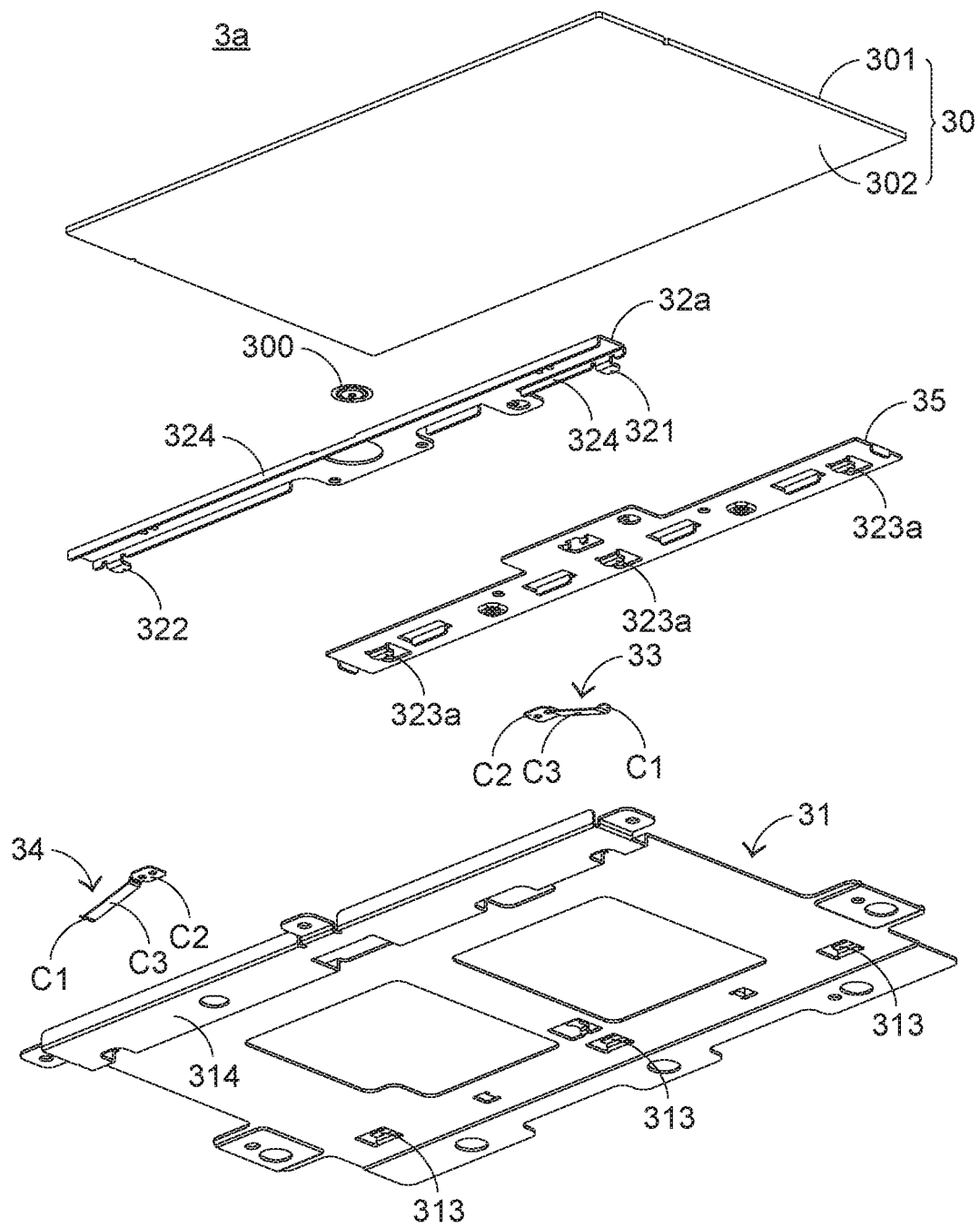
FIG. 14 is a schematic exploded view illustrating the touchpad module as shown in FIG. 13 and taken along another viewpoint.

Please refer to FIGS. 13 and 14. FIG. 13 is a schematic exploded view illustrating the touchpad module according to a second embodiment of the present invention. FIG. 14 is a schematic exploded view illustrating the touchpad module as shown in FIG. 13 and taken along another viewpoint. In comparison with the touchpad module 3 shown in FIGS. 5 to 10, the touchpad module 3a of this embodiment further comprises a third base plate 35 and the second base plate 32a is distinguished. Both of the second base plate 32a and the third base plate 35 are arranged between the touch member 30 and the first base plate 31. In addition, the second base plate 32a is aligned with the first edge portion S1 of the first base plate 31, and the third base plate 35 is aligned with the second edge portion S2 of the first base plate 31. In other words, the third base plate 35 and the second base plate 32a are separated from each other by a gap G. In this embodiment, the second base plate 32a comprises a third stopping part 321, a fourth stopping part 322 and retaining wall 324. Moreover, the third base plate 35 comprise at least one second coupling part 323a. The at least one second coupling part 323a of the third base plate 35 is engaged with the at least one first coupling part 313, which is included in the second edge portion S2 of the first base plate 31. The other components of the touchpad module 3a, the relationships between components of the touchpad module 3a and the operations of the touchpad module 3a are similar to those of the touchpad module as shown in FIGS. 5 to 12, and not redundantly described herein.

From the above descriptions, the structure of the touchpad module is specially designed. Due to the cooperation of the stopping parts and the elastic elements, the heights of the left side and the right side of the bottom surface of the touch member are substantially equal. Consequently, the structural flatness and the structural rigidity of the touchpad module are enhanced, and the pressing force and the press stroke are more uniform. Moreover, the first base plate is equipped with the recess, and the second base plate is equipped with the retaining wall. Consequently, the overall structural rigidity of the touchpad module is largely increased to meet the slimness requirements.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims which are to be accorded with the broadest interpretation so as to encompass all such modifications and similar structures.

What is claimed is:

1. A touchpad module for a computing device, the touchpad module being installed within a fixing frame of a computing device, the touchpad module comprising:
   a touch member comprising a switch;
   a first base plate located under the touch member, and comprising a triggering part, a first stopping part and a second stopping part, wherein the first stopping part and the second stopping part are respectively located beside two lateral sides of the triggering part, and the triggering part is aligned with the switch;
   a second base plate arranged between the touch member and the first base plate, and comprising a third stopping part and a fourth stopping part, wherein the third stopping part is engaged with the first stopping part, and the fourth stopping part is engaged with the second stopping part;
   a first elastic element arranged between the first base plate and the second base plate; and
   a second elastic element arranged between the first base plate and the second base plate, and located beside the first elastic element,
   wherein when an external force is exerted on a first region of the touch member, the touch member is swung toward the first base plate by using a junction between the second stopping part and the fourth stopping part as a fulcrum, so that the switch is contacted with the triggering part and the second base plate is correspondingly swung toward the first base plate, wherein while the second base plate is swung toward the first base plate, the second base plate is moved downwardly to push the first elastic element, so that the first elastic element is subjected to deformation and the third stopping part is disengaged from the first stopping part.

2. The touchpad module according to claim 1, wherein when the external force is exerted on a second region of the touch member, the touch member is swung toward the first base plate by using a junction between the first stopping part and the third stopping part as the fulcrum, so that the switch is contacted with the triggering part and the second base plate is correspondingly swung toward the first base plate, wherein while the second base plate is swung toward the first base plate, the second base plate is moved downwardly to push the second elastic element, so that the second elastic element is subjected to deformation and the fourth stopping part is disengaged from the second stopping part.

3. The touchpad module according to claim 1, wherein the first base plate comprises a first edge portion and a second edge portion opposed to the first edge portion, and the second base plate comprises a third edge portion and a fourth edge portion opposed to the third edge portion, wherein the first edge portion and the third edge portion are aligned with each other, and the second edge portion and the fourth edge portion are aligned with each other, wherein the triggering part, the first stopping part and the second stopping part are included in the first edge portion, and the third stopping part and the fourth stopping part are included in the third edge portion.

4. The touchpad module according to claim 3, wherein the first base plate further comprises at least one first coupling part, and the second base plate further comprise at least one second coupling part, wherein the at least one first coupling part is included in the second edge portion of the first base plate, the at least one second coupling part is included in the fourth edge portion of the second base plate, and the at least one first coupling part is engaged with the at least one second coupling part.

5. The touchpad module according to claim 3, wherein the first base further comprises a recess, and the second base plate further comprises a retaining wall, wherein the recess is concaved in a direction away from the second base plate, the retaining wall is extended in a direction toward the first base plate, the recess is included in the first edge portion of the first base plate, and the retaining wall is included in the third edge portion of the second base plate.

6. The touchpad module according to claim 5, wherein the third stopping part and the fourth stopping part are connected with the retaining wall, the retaining wall is extended in a first direction toward the first base plate, and the third stopping part and the fourth stopping part are extended in a second direction, wherein the first direction and the second direction are not in parallel with each other.

7. The touchpad module according to claim 5, wherein the first elastic element and the second elastic element are arranged between the first edge portion of the first base plate and the third edge portion of the second base plate, wherein each of the first elastic element and the second elastic element comprises:
 a first connection part contacted with the recess of the first base plate;
 a second connection part contacted with the second base plate, and located beside the retaining wall; and
 an inclined part connected between the first connection part and the second connection part.

8. The touchpad module according to claim 1, wherein the touchpad module further comprises a third base plate, and the third base plate is arranged between the touch member and the first base plate, wherein the first base plate comprises a first edge portion and a second edge portion opposed to the first edge portion, wherein the first stopping part and the second stopping part are included in the first edge portion, the second base plate is aligned with the first edge portion, and the third base plate is aligned with the second edge portion.

9. The touchpad module according to claim 8, wherein the first base plate further comprises at least one first coupling part, and the third base plate comprise at least one second coupling part, wherein the at least one first coupling part is included in the second edge portion of the first base plate, and the at least one first coupling part is engaged with the at least one second coupling part.

10. The touchpad module according to claim 1, wherein the touch member comprises a circuit board and a covering plate, wherein the covering plate is located over the circuit board, and the switch is installed on the circuit board.

11. A computing device, comprising:
 a casing, wherein a fixing frame is concavely formed in the casing;
 a processor disposed within the casing; and
 a touchpad module disposed within the casing and electrically connected with the processor, wherein the touchpad module comprises:
  a touch member comprising a switch;
  a first base plate located under the touch member, and comprising a triggering part, a first stopping part and a second stopping part, wherein the first stopping part and the second stopping part are respectively located beside two lateral sides of the triggering part, and the triggering part is aligned with the switch;
  a second base plate arranged between the touch member and the first base plate, and comprising a third stopping part and a fourth stopping part, wherein the third stopping part is engaged with the first stopping part, and the fourth stopping part is engaged with the second stopping part;
  a first elastic element arranged between the first base plate and the second base plate; and
  a second elastic element arranged between the first base plate and the second base plate, and located beside the first elastic element,
 wherein when an external force is exerted on a first region of the touch member, the touch member is swung toward the first base plate by using a junction between the second stopping part and the fourth stopping part as a fulcrum, so that the switch is contacted with the triggering part and the second base plate is correspondingly swung toward the first base plate, wherein while the second base plate is swung toward the first base plate, the second base plate is moved downwardly to push the first elastic element, so that the first elastic element is subjected to deformation and the third stopping part is disengaged from the first stopping part.

* * * * *